United States Patent
Gagnon et al.

[15] 3,647,510
[45] Mar. 7, 1972

[54] POLYSULFONES COATED WITH ORGANOPOLYSILOXANES

[72] Inventors: Donald W. Gagnon, Sylvania; James J. Tillman, Toledo, both of Ohio

[73] Assignee: Owens-Illinois, Inc., Toledo, Ohio

[22] Filed: June 9, 1969

[21] Appl. No.: 831,752

[52] U.S. Cl. ............ 117/46 FC, 117/138.8 A, 117/161 ZA
[51] Int. Cl. ........................... B44d 1/092, B44d 5/04
[58] Field of Search ............ 117/138.8 A, 161 ZA, 46 FC

[56] References Cited

UNITED STATES PATENTS

| | | | |
|---|---|---|---|
| 3,050,411 | 8/1962 | Keil | 117/161 ZA |
| 3,257,343 | 6/1966 | Glaser et al. | 117/138.8 A |
| 3,383,773 | 5/1968 | Nugent | 34/9 |
| 3,389,114 | 6/1968 | Burzynski et al. | 117/135.1 |
| 3,389,121 | 6/1968 | Burzynski et al. | 117/135.1 |
| 3,414,540 | 12/1968 | Nugent et al. | 117/135.1 |
| 2,258,218 | 10/1941 | Rochow | 117/122 |

OTHER PUBLICATIONS

Walton, Polysulfone Resin, Modern Plastics Encyclopedia 1968 pp. 259–261

*Primary Examiner*—William D. Martin
*Assistant Examiner*—M. Sofocleous
*Attorney*—Richard D. Heberling and E. J. Holler

[57] ABSTRACT

Process, and the article produced thereby, for providing a hard, acetone-resistant and mar-resistant coating on articles having a polysulfone surface by applying to the surface a solvent-soluble, further curable organopolysiloxane in an organic solvent and thereafter evaporating the solvent and finally curing the organopolysiloxane. The solvent-soluble, further curable organopolysiloxane is made by heating methyltrialkoxysilane or a mixture of methyltrialkoxysilane and phenyltrialkoxysilane and water in the presence of a hydrolysis catalyst at a sufficient temperature and for a suitable time to form a partial condensation product, concentrating this product by heating it to remove some alkanol byproduct and water and thereafter heating the product below the gel point thereof to provide the solvent soluble, further curable organopolysiloxane.

10 Claims, No Drawings

POLYSULFONES COATED WITH ORGANOPOLYSILOXANES

This invention generally relates to organopolysiloxane coating compositions for various polysulfone surfaces, processes for the application of same, and articles which are coated with these compositions. More specifically, the invention relates to organopolysiloxane coating compositions which can be applied to polysulfone resins for purposes of enhancing the properties thereof.

A large number of coating compositions for plastics and resins are generally known in the prior art. These prior art coatings are, however, generally deficient in one or more of the following ways: they are difficult to apply, possess poor hardness and mar resistance, are susceptible to attack by organic polar solvents, have poor heat resistance, and possess poor optical properties.

Polysulfone resins, and substrates produced therefrom, are known to possess many desirable properties which have been responsible for the use of these resins in various industries. Because these resins are capable of being melted, extruded or thermoformed into a wide variety of shapes, they have been found to be of great utility in the electronic, automotive, aircraft and appliance industries. Unfortunately, however, because of certain detrimental characteristic properties of the polysulfones, these resins have not achieved their full potential. The polysulfones are known to possess a relatively soft surface and are consequently susceptible to marring. Additionally, these resins are known to be very susceptible to attack by polar organic solvents such as, for example, the ketones. Those skilled in the art will readily appreciate the fact that the utility of these resins would be greatly increased if a coating were provided for the polysulfones which would remedy the above recitied deficiencies of these resins.

Consequently, it is an object of this invention to produce a superior coating composition for use on polysulfone resins and to provide a process for effecting the application of this coating.

It is another object to provide a coating for polysulfone resins which is hard and mar resistant.

It is another object of this invention to provide a coating for polysulfone resins which is capable of withstanding attack by polar, organic solvents.

Yet another object of this invention is to provide a clear, glossy coating for polysulfones.

According to one feature of this invention, methyltrialkoxysilane is hydrolyzed with water in the presence of a hydrolysis catalyst for about 1 to 10 hours at a temperature generally above about 40° C. and less than reflux temperature, preferably within the temperature range of about 50° to 90° C. to produce a partial condensation product; the partial condensation product is then concentrated by heating to about 65° to 300° C. and preferably within the temperature range of about 70° to 150° C. to remove alkanol byproduct and water; the concentrated product is then precured at a temperature of about 70° to 300° C. and below the gel point thereof and then processed to provide a solid, solvent-soluble, further curable organopolysiloxane; the solvent-soluble, further curable organopolysiloxane is then dissolved, for example, to a concentration of 5 to 85 percent by weight in a suitable solvent and the solution then applied to the polysulfone surface, after which the solvent is evaporated and the organopolysiloxane finally cured to provide a strongly adhered, hard, solvent-resistant thermoset coating on the polysulfone surface. The processing referred to above for producing the solid, further curable organopolysiloxane may comprise cooling or may include the flaking or spray drying techniques respectively disclosed in U.S. Pat. No. 3,414,540 and U.S. Pat. No. 3,383,773. Optionally, instead of further solidifying the precured organopolysiloxane to provide a solid, solvent-soluble, further curable organopolysiloxane, the precuring may be discontinued after an effective short interval and the resulting organopolysiloxane dissolved in a suitable solvent and then applied to the polysulfone surface.

According to another feature of this invention, a mixture of methyltrialkoxysilane and phenyltrialkoxysilane is hydrolyzed with water in the presence of a hydrolysis catalyst for about 1 to 10 hours at a temperature between ambient and reflux to produce a partial condensation product; the partial condensation product is then concentrated by heating to remove about 50 to 90 mole percent alkanol byproduct and some water; the concentrated product is then precured at a temperature of about 70° to 400° C., usually less than about 250° C. and below the gel point thereof and then solidified to provide a solid, solvent-soluble, further curable organopolysiloxane. The solid, solvent-soluble, further curable organopolysiloxane is then dissolved, for example, to a concentration of about 5 to 85 percent by weight in a suitable solvent and the solution then applied to the polysulfone surface, after which the solvent is evaporated and the organopolysiloxane finally cured to provide a strongly adhered, hard, solvent-resistant thermoset coating on the polysulfone surface. The solidification may likewise comprise cooling or may include the flaking or spray drying techniques respectively disclosed in U.S. Pat. No. 3,414,540 and U.S. Pat. No. 3,383,773. Instead of solidifying the precured organopolysiloxane produced from this silane mixture to provide a solid, solvent-soluble, further curable organopolysiloxane, as indicated above, the precuring may be discontinued after an effective short interval and the resulting organopolysiloxane diluted in a suitable solvent and then applied to the polysulfone surface.

In general, the alkoxy groups of the starting trifunctional silane compounds used in the preparation of the solvent-soluble, further curable organopolysiloxanes recited above will advantageously contain 1–6 carbon atoms. Particularly suitable silanes include methyltriethoxysilane and phenyltriethoxysilane. For further details regarding the preparation of the solvent-soluble, further curable organopolysiloxanes which are advantageously and surprisingly effective in producing the coated polysulfones of this invention, reference may be had to U.S. Pat. No. 3,389,114 and U.S. Pat. No. 3,389,121, both of which are hereby incorporated by reference. U.S. Pat. No. 3,383,773 and U.S. Pat. No. 3,414,540 relating to the preparation of solid, solvent-soluble, further curable organopolysiloxane suitable for use in the practice of this invention are also hereby incorporated by reference.

The polysulfones which are advantageously coated in accordance with this invention are those polymers which are in general characterized by the repeating unit carbon-sulfur dioxide-carbon, i.e.,

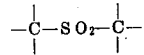

The carbon atoms may be supplied by means of aliphatic groups or aromatic groups and various substituted groups of these types. Most advantageously, the polysulfones will be of the generally rigid polyaryl sulfone type, having a number average molecular weight of about 20,000 to 100,000 or higher, wherein the carbon atoms for the carbon-sulfur dioxide-carbon repeating unit are supplied by benzene rings or substituted benzene rings. Thus, in its simplest form, the polyarylsulfones which are advantageously employed will be characterized by the following structure:

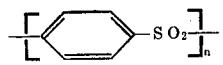     I wherein $n$ is an integer in the range of about 175 to about 875. Other polyarylsulfones which are advantageously coated in accordance with this invention may be represented by the following structures:

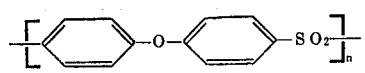     II wherein n is an integer of about 87 to about 435;

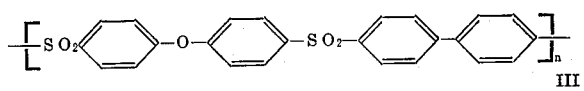

wherein n is an integer of about 59 to about 290;

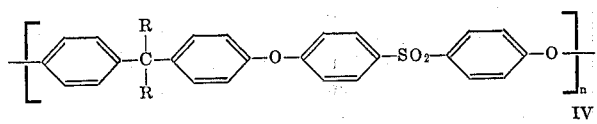

wherein R is an alkyl of up to about seven carbon atoms including propyl, butyl and hexyl and preferably each of the R groups will be independently selected from the group of methyl and ethyl, and wherein n is about 50–80; and

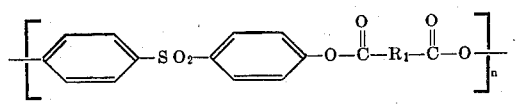

wherein $R_1$ is a divalent radical such as a straight or branched alkylene group having up to 12 carbon atoms, including dodecylene, and preferably 10 carbon atoms or less, including methylene, ethylene, propylene, hexylene, octylene and decylene, or an arylene group or a substituted arylene group like ethylphenylene, isopropylphenylene and the like, and n is about 63 to about 310. In all of these it will be noted that the polymers will be characterized by the repeated occurrence of the $—SO_2$-group being joined to the carbon atom of a benzene ring structure. Consequently, as used herein, the term "polyarylsulfone" is intended to comprehend those sulfone polymers containing a repeating unit which includes the $—SO_2$-group and in which the bivalency of this group is satisfied by carbon to sulfur bonds wherein the carbon atoms are supplied by a benzene ring structure. Of course, if desired, the benzene rings or the diphenyl rings or the diphenylether rings of the structural units represented by Formulas I–V above may be halide substituted, that is, provided with chlorine, fluorine, etc., they may be alkyl substituted with either straight or branched alkyl groups having up to about nine carbon atoms such as methyl, ethyl, propyl, isopropyl, butyl, octyl, etc., or they may be ester or acid substituted. In general, however, the unsubstituted polyarylsulfones set forth in Formulas I–V will be advantageously employed because of their ready commercial availability. These polyarylsulfones may be procured from Union Carbide Corporation, Plastics Division, or Minnesota Mining and Manufacturing Company.

For a further discussion of the aforementioned polyarylsulfones, reference may be had to Modern Plastics Encyclopedia, 1967, p. 291; Modern Plastics Encyclopedia, 1968, p. 259; Chemical And Engineering News (Apr. 21, 1969), p. 57, and ACS Polymer Preprints, Vol. 10, Number 1, Apr., 1969, p. 160, all of which are hereby incorporated by reference.

Other available sulfones include the polymers of the family of olefin sulfones and preferably the alpha olefin sulfones and the aliphatic sulfones. These sulfones, however, are known to be somewhat thermally unstable and elastic. Consequently, they are of less importance than the polyarylsulfones described above because of the inherent deficiencies in their properties.

The following examples are illustrative of the manner of practicing this invention, it, of course, being understood that the examples are not to be construed as limiting the invention but merely set forth as exemplary of the manner of using this invention.

EXAMPLE I

An organic partial condensation prepolymer product was prepared by hydrolyzing and condensing about 1 mole of methyltriethoxysilane with 2½ moles of water and 3 weight parts of HCl per million parts of water and silane, the silane first being purified by distillation to about zero p.p.m. of HCl.

The reaction mixture was heated with agitation in a flask equipped with a condenser until the pot temperature reached 80° C. This temperature was maintained for 4 hours. After about 20 minutes, the two-phase reaction mixture clarified to a one-phase system due to the ethanol liberated in the reaction acting as a mutual solvent. At the end of the 4-hour period, approximately 78 g. of an ethanol-water mixture (about 92 percent alcohol) was removed by distillation. The hydrolysis and condensation reaction, and concentration thereafter, produced a viscous liquid. The viscous liquid prepolymer was refluxed at 50 percent solids for 20 hours to increase the viscosity to 30 centipoises at 50 percent solids at 25° C. in ethanol.

The viscous liquid, having a viscosity of about 30 centipoises at 50 percent solids at 25° C. in ethanol, was further treated by forming a film thereof and heating the film in a wiped film evaporator. The evaporator was operated at a wall temperature of about 200° C. that provides a product temperature of about 160° C. The mean residence time was about 20 seconds.

The resultant liquid precured material was solidified in about 1 to 1½ minutes and broken up into flakes by a drum flaker unit.

EXAMPLE I-A

The flakes of the solvent-soluble, further curable organopolysiloxane as produced above in Example I, were then dissolved in a mixture of n-butanol and methyl isobutyl ketone (3 parts butanol per part ketone by volume) to a resin solids concentration of about 40 percent by weight. The resultant solution was then filtered to remove contaminants, such as dust and dirt, and to clarify the solution.

A transparent rigid polyarylsulfone substrate having a thickness of about one-eighth inch and characterized by the repeating benzene ring-sulfur dioxide unit, i.e.,

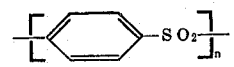

with a molecular weight of about 75,000, was first flame treated and then dipped into the 40 percent resin solids solution. While dipping constitutes one mode of coating the substrate, it, of course, will be apparent that other conventional coating techniques, such as, for example, spray, roller or flow coating techniques, may be employed. Additionally, a suitable commercially available polyarylsulfone which may be employed as the substrate is the polysulfone furnished by Union Carbide Corporation as their product P-1700, a transparent, amber tinted material which is generally rigid but slightly flexible.

The polysulfone substrate which had been dip coated as above was then heated in an oven to about 135° C. for about 18 hours to evaporate the solvent and finally cure the further curable organopolysiloxane resin. This polyarylsulfone substrate having the clear, glossy, cured organopolysiloxane coating was then tested to determine the adhesion, acetone resistance and hardness of the coated surface.

The acetone resistance was determined by wiping the coated surface with a tissue which had been saturated with acetone and then visually observing the coated surface after it had dried. If the coating becomes cloudy, the acetone resistance is generally designated as poor, whereas, if there is no deterioration in the coating's appearance, an excellent designation is employed. The polyarylsulfone substrate having the clear, glossy, cured organopolysiloxane resin coating showed excellent acetone resistance. That is, the clear coating showed no signs of cloudiness after the acetone wiping.

The adhesion of the coating is determined by scribing an X in the coated surface and then applying adhesive tape to the scribed section. Upon pulling of the tape, if there is no noticeable removal of the coating, it is designated excellent. No coating removal was discernible when the coated substrate of this example was so tested.

The hardness of the coated substrate is determined by two testing methods. One may be termed the pencil hardness and the other the porcelain-enamel hardness.

In testing a coated substrate to determine its pencil hardness, two steps are involved. First of all, the fingernail is firmly translated along the coating. If the coating mars, the test is discontinued and the coating is deemed to have poor hardness. If, on the other hand, no marring is produced, graphite pencils of increasing hardness are successively drawn across the coated surface until a noticeable scribing or surface penetration appears. The pencil, or graphite, hardness producing the scribe thus becomes the coating hardness designation. The coating of this example has a hardness greater than 7H.

The other mode of determining hardness is the so-called porcelain-enamel test, which is done on a PEI Abrasion Tester developed at the National Bureau of Standards by the Porcelain-Enamel Institute Associateship and manufactured by Keystone Electric Company of Baltimore, Maryland. Under this test a substrate and a tubular or cylindrical member are unitarily mounted on an oscillatable table. The tubular member is charged with a standard load, which in this instance was 67.8 grams of steel shot (one-sixteenth to one-eighth inch diameter), 1.2 grams of sand and 7.7 ml. of water and suitable means such as a gasket are used to provide a leakproof seal between the substrate and tubular member. Upon oscillation of the table, the contents of the tubular member are vigorously agitated and, since the tube is open ended, therefore abrade the substrate surface. By employing a standard number of oscillations, in this case 500, and visually inspecting the substrate after this time, an indication of the hardness of the substrate is obtained. The visual inspection is a qualitative evaluation of the intensity of the marring or scratching of the surface. A substantially marred surface is designated as having poor hardness, whereas good hardness is attributed to the surface if little scratching is discernible.

The polyarylsulfone substrate having the coated surface as described above showed good hardness.

EXAMPLE I-B

The procedure of Example I-A was repeated escept that the 40 percent solution of further curable organopolysiloxane also contained gamma-aminopropyltriethoxysilane as a curing catalyst in an amount of about 1 percent by weight of the resin solids. After dipping, the coated polyarylsulfone was heated to about 110° C. for about 30 minutes to evaporate the solvent and finally cure the further curable organopolysiloxane. When tested by the procedures of Example I-A, the same excellent results were obtained.

EXAMPLE I-C

The procedure of Example I-A was followed except that the solvent consisted of n-butanol. Again, the same excellent coated polyarylsulfone substrate was produced.

EXAMPLE I-D

The polyarylsulfone substrate of the type used in Example I-A was first dipped into acetone. Crazing, or stress cracking, of the substrate was immediately evident upon withdrawing the substrate from the acetone.

The procedure of Example I-A was then repeated except the solution consisted of 25 percent by weight of the further curable organopolysiloxane in acetone. Again, the same excellent coatings were produced and, for some unexpected reason, no crazing appeared either upon withdrawing the substrate from the solution or upon curing of the coated substrate.

EXAMPLE II

About 0.75 moles of methyltriethoxysilane, 1.69 moles of distilled water and 3 weight parts HCl per million parts of total methyltriethoxysilane and water were heated and stirred under reflux until the initially two-phase system had cleared (about 20 minutes) and then for an additional 4 hours. At the end of this time, about 78 percent of the theoretical amount of byproduct ethanol was distilled off and the concentrated liquid methylsiloxane partial condensation product which remained as the distillation residue was poured into a beaker. The partial condensation product was then heated, below the gel point thereof, to about 140° C. for about three-fourths to 1 minute to produce a precured, that is, further curable, solvent soluble organopolysiloxane resin. This precured product was then added to a mixture of three parts n-butanol and one part methyl isobutyl ketone (parts by volume) to produce a solution of about 30 percent by weight of the further curable organopolysiloxane resin. The procedure of Example I-A was repeated and the same excellent, coated, polyaryl sulfone substrate was obtained.

EXAMPLE III

An organopolysiloxane prepolymer was prepared from methyltriethoxysilane and phenyltriethoxysilane, using 2 moles of the methyl silane and 1 mole of the phenyl silane. The mixture of methyl and phenyltriethoxysilanes was hydrolyzed and condensed with 9 moles of water (3 moles water per mole of total silane) and 2.5 parts of HCl per million parts of water and silane, the silanes first being purified by distillation to about zero p.p.m. of HCl.

The reaction mixture was heated with agitation in a flask equipped with a condenser until the pot temperature reached 80° C. This temperature was maintained for 4 hours. After about 20 minutes, the two-phase reaction mixture clarified to a one-phase system due to the ethanol liberated in the reaction acting as a mutual solvent. At the end of the four-hour period, approximately 282 g. of an ethanol-water mixture (about 92 percent alcohol) was removed by distillation. The hydrolysis and condensation reaction and the concentrating by removal of alkanol byproduct and water thereafter produced a viscous liquid.

The viscous liquid, having a viscosity of about 40 centipoises at 60 percent solids at 25° C. in ethanol, was refluxed for 15 hours to provide same with a heat history and a final viscosity of about 60 centipoises at 60 percent solids and 25° C.

The liquid was then precured in a wiped film evaporator operating at a 195°–200° C. wall temperature to provide a liquid product temperature of about 170°–175° C. for a mean residence time of less than 40 seconds, namely, about 20 seconds. The resultant precured material was chilled and solidified in about 60 seconds by passing the liquid through a drum flaker. The liquid was solidified into sheets which were broken up into flakes which had a melting point of about 55° C. and were substantially free from gel.

The procedure of Example I-A was generally repeated using the flakes as produced above. Test results of the final coating were as follows: excellent acetone resistance, excellent adhesion, and a hardness of 7H.

EXAMPLE IV

A commercially available organopolysiloxane, such as that manufactured and sold by General Electric Company, under their designation G. E. 350, was employed. This particular resin is an organopolysiloxane produced from a methyltrialkoxysilane wherein the alkoxy group is believed to be isopropoxy. A solution of the G. E. 350 resin was prepared by adding the resin to normal butanol to produce a solution of about 40 percent by weight of the solid resin. Additionally, as a catalyst is required to produce the finally cured product, triethanolamine was added in the ratio of about one-fourth percent by weight of the resin in solution. The polyarylsulfone of the type used in Example I-A was first flame treated and then dipped into the catalyzed G. E. 350 solution. The coated polyarylsulfone substrate was then heated to about 135° C. for about 6 hours. After this time, the coating was extremely soft and, consequently, heating was then continued for an additional 12 hours. That is, in all total, the coated substrate was heated for about 18 hours at 135° C. The resultant coated substrate was then evaluated in accordance with the procedures of Example I-A. The results showed that the coating had poor acetone resistance, excellent adhesion, and poor hardness. The hardness was such that the coating was easily marred by scratching with a fingernail. Consequently, no pencil hardness determination was made. The porcelain-enamel test showed poor hardness.

As will be readily apparent from the above, the coating material which is advantageously employed in accordance with this invention to enhance the properties of polysulfone substrates are those solvent-soluble, further curable organopolysiloxanes which are manufactured (according to the hydrolysis and condensation reaction techniques set forth above) from trifunctional silanes. More specifically, the starting trifunctional silanes are those wherein the trifunctionality is supplied via alkoxy groups.

U.S. Pat. No. 2,258,218 also discloses further curable organopolysiloxanes which may be applied in solution to certain substrates and then finally cured to form a coating thereon. In Example 2 of U.S. Pat. No. 2,258,218, there is disclosed a procedure for reacting silicon tetrachloride and methyl magnesium bromide to obtain a reaction product which can be subsequently hydrolyzed to form an organopolysiloxane. This reaction product, in addition to containing the tri-methyl and di-methyl chlorosilane derivatives, will contain about 60 percent of the trifunctional derivative, that is, methyltrichlorosilane. In Example V, which follows, the procedure of Example 2 of U.S. Pat. No. 2,258,218 was generally followed to prepare a polymer to be used for coating polysulfones and against which applicant's coating can be compared. The procedure was slightly modified, however, in that the starting silane was methyltrichlorosilane. Thus, instead of using the mono, di and trichloro-silane mixture, which obviously would not provide a meaningful comparison to the resins produced by using the trihydroxy functional silane starting materials of this invention, the reaction of $SiCl_4$ and $CH_3MgBr$ was not carried out. Instead, $CH_3SiCl_3$ was employed as the starting material for polymerization because of its trifunctionality.

EXAMPLE V

About 100 grams of $CH_3SiCl_3$ was diluted in about 275 cc. of diethylether at room temperature. This solution was then slowly poured upon cracked ice to hydrolyze the starting silane and form two immiscible phases. The ether soluble phase was then separated and washed three times to remove HCl. The resulting purified ether soluble phase was then allowed to set out overnight and the residue which remained was a viscous, light yellow, liquid mass.

EXAMPLE V-A

The viscous, light yellow, liquid mass produced by Example V was then dissolved in acetone to produce a solution of about 30% resin solids. A polyarylsulfone substrate, which was the same type as that employed in Examples I-(A-D), II, III and IV, was flame treated and then dipped into the solution. Crazing of the substrate was immediately evident upon withdrawing it from the solution. This is in marked contrast to the results of Example I-D supra. No further testing was done because of the undesirable crazing.

EXAMPLE V-B

The viscous, light yellow, liquid mass of Example V was then dissolved in n-butanol to a solids concentration of about 30 percent by weight. The type of polyarylsulfone substrate used in Example I-A was flame treated and dipped into this solution.

The coated polyarylsulfone substrate was then cured by heating to about 135° C. for 1 hour. Resistance to acetone of the cured coating was poor and the coating was soft, that is, it was easily marred when rubbed with a fingernail. This same cured substrate was then heated for an additional 2 hours. No improvement in the characteristics of the coating resulted.

EXAMPLE V-C

The procedure of Example V-B was repeated except curing was effected by heating to about 135° C. for about 18 hours. The acetone resistance of the coating was poor to fair in that the coating became somewhat cloudy. Adhesion, however, was excellent. The hardness remained poor in that the coating was easily marred with a fingernail and was substantially scratched with the porcelain-enamel test.

Table I below in general summarizes the results of the above examples:

TABLE 1

| Coating material | Ex. IV | Polymer from $CH_3SiCl_3$ Ex. V | Ex. I (A-D) and Ex. II | Ex. III |
|---|---|---|---|---|
| Acetone resistance | Poor | Poor-fair | Excellent | Excellent. |
| Adhesion | Excellent | Excellent | do | Do. |
| Hardness: | | | | |
| a. Pencil | Poor | Poor | do | Do. |
| b. Porcelain enamel. | do | do | Good | Good. |

While the above examples set forth the best mode contemplated in practicing this invention, it will, of course, be apparent that modification is possible. For example, while n-butanol, acetone and methylisobutyl ketone were used as solvents for the solvent-soluble, further curable organopolysiloxane, other solvents such as, for example, methanol, ethanol, isobutanol, ethyl acetate, dioxane ethylene glycol monomethyl ether, ethylene glycol monoethyl ether, ethylene glycol monobutyl ether and the like may also be employed. Also, if desired, the solution of further curable organopolysiloxane may include suitable adjuvants such as fillers, colorants, and dopants. In certain instances, it may be desirable to include in the solution about 1 to about 5 percent by weight (of the organopolysiloxane solids) of an ultraviolet light absorbing compound like 2-hydroxy-4-methoxybenzophenone or 2,2'-dihydroxy-4-methoxybenzophenol. Organic acids such as tartaric, gluconic or citric acid may also be incorporated in the organopolysiloxane solution to increase the weather resistance and alter the flexibility of the coating.

In general, the final cure of the further curable organopolysiloxane will be effected by heating to a temperature of about 100° C. to about 135° C. for a period of about one-half hour to about 24 hours. The time and temperature may, of course, be varied in other ranges so long as the polysulfone substrate which is employed is capable of withstanding the specific heating intensity employed. That is, the curing is done under conditions of time and temperature which will not cause any degradation in the properties of the polysulfone. In general, however, the temperatures will be below about 175° C.

Having described our invention and having set forth the best mode contemplated in practicing our invention, We claim:

1. A process for producing an article having a polysulfone surface which is coated to provide a hard mar-resistant, heat-resistant, and acetone-resistant coated surface, the process comprising the steps of:

A. Applying a solution of a further curable organopolysiloxane in an organic solvent on the polysulfone surface, said further curable organopolysiloxane being a precured hydrolysis and condensation product of a silane of the group consisting of methyltrialkoxysilane and a mixture of methyltrialkoxysilane and phenyltrialkoxysilane in which the alkoxy group contains less than six carbon atoms prepared by (I) heating said silane and water for about 1 to about 10 hours at a temperature between ambient and reflux to produce a siloxane partial condensation product; (II) concentrating said siloxane partial condensation product by heating to remove about 50 to about 90 mole percent alkanol byproduct and some water, after which the resultant product is precured by heating below the gel point thereof to provide a solvent soluble, further curable organopolysiloxane, and B. evaporating the solvent for said organopolysiloxane and finally curing said organopolysiloxane to provide a thermoset coating on said polysulfone surface.

2. The article produced in accordance with claim 1.

3. The process of claim 1 wherein said polysulfone surface is flame treated prior to the application of said solution.

4. The process of claim 1 wherein said polysulfone surface is a polyarylsulfone surface.

5. The process of claim 4 wherein said silane is methyltrialkoxysilane.

6. The process of claim 5 wherein the alkoxy group is the ethoxy group.

7. The process of claim 4 wherein said silane is a mixture of methyltrialkoxysilane and phenyltrialkoxysilane.

8. The process of claim 7 wherein the alkoxy groups of said silanes are both ethoxy groups.

9. A process for producing an article having a polyarylsulfone surface which is coated to provide a hard, mar-resistant, heat-resistant and acetone-resistant coated surface, the process comprising the steps of:

A. applying a solution of a further curable organopolysiloxane in acetone on said polysulfone surface, said further curable organopolysiloxane being a precured hydrolysis and condensation product of a silane of the group consisting of methyltrialkoxysilane and a mixture of B. evaporating and phenyltrialkoxysilane in which the alkoxy group contains less than six carbon atoms prepared by (I) heating said silane and water for about 1 to about 10 hours at a temperature between ambient and reflux to produce a siloxane partial condensation product; (II) concentrating said siloxane partial condensation product by heating to remove about 50 to about 90 mole percent alkanol byproduct and some water, after which the resultant product is precured by heating below the gel point thereof to provide a solvent soluble, further curable organopolysiloxane, and evaporating the acetone and finally curing said organopolysiloxane to provide a thermoset coating on said polysulfone surface.

10. The process of claim 9 wherein said polyarylsulfone surface is flame treated prior to the application of said solution onto said surface.

* * * * *

PO-1050
(5/69)

UNITED STATES PATENT OFFICE
CERTIFICATE OF CORRECTION

Patent No. 3,647,510      Dated March 7, 1972

Inventor(s) Donald W. Gagnon and James J. Tillman

It is certified that error appears in the above-identified patent and that said Letters Patent are hereby corrected as shown below:

```
Column 10, line 12, claim 9, delete "B. evaporating"
and substitute: - - methyltrialkoxysilane - -
Column 10, line 22, after ", and" add - - B - - .
```

Signed and sealed this 1st day of August 1972.

(SEAL)
Attest:

EDWARD M. FLETCHER, JR.      ROBERT GOTTSCHALK
Attesting Officer      Commissioner of Patents